(12) United States Patent
Dziekan, Jr. et al.

(10) Patent No.: US 7,024,628 B2
(45) Date of Patent: Apr. 4, 2006

(54) BROAD BAND TEST POINT ELEMENT MANAGEMENT SYSTEM

(75) Inventors: Richard R. Dziekan, Jr., North Wales, PA (US); Robert Green, Rushland, PA (US)

(73) Assignee: General Instrument Corporation, Horsham, PA (US)

(*) Notice: Subject to any disclaimer, the term of this patent is extended or adjusted under 35 U.S.C. 154(b) by 321 days.

(21) Appl. No.: 09/867,151

(22) Filed: May 29, 2001

(65) Prior Publication Data

US 2002/0180779 A1 Dec. 5, 2002

(51) Int. Cl.
*G06F 15/16* (2006.01)

(52) U.S. Cl. ...................................... 715/736; 715/771

(58) Field of Classification Search ................ 345/736, 345/744, 747, 716; 709/203, 223, 224, 226; 359/177, 110, 174, 175; 715/771–773, 964, 715/734–737, 747, 965, 966, 969
See application file for complete search history.

(56) References Cited

U.S. PATENT DOCUMENTS

| | | | |
|---|---|---|---|
| 5,615,323 A * | 3/1997 | Engel et al. ................. | 345/440 |
| 5,867,483 A * | 2/1999 | Ennis et al. ................. | 370/252 |
| 5,956,372 A | 9/1999 | Vaman et al. | |
| 5,991,336 A | 11/1999 | Scholtz et al. | |
| 6,366,381 B1 * | 4/2002 | Anderson .................... | 398/180 |
| 6,484,124 B1 * | 11/2002 | MacMullen .................. | 702/182 |
| 6,502,131 B1 * | 12/2002 | Vaid et al. ................... | 709/224 |
| 6,578,077 B1 * | 6/2003 | Rakoshitz et al. .......... | 709/224 |
| 6,590,587 B1 * | 7/2003 | Wichelman et al. ........ | 345/736 |

* cited by examiner

*Primary Examiner*—Steven Sax
(74) *Attorney, Agent, or Firm*—Lawrence T. Cullen

(57) ABSTRACT

The present invention relates to a method for graphically presenting information representative of the operation of a communication system to a user monitoring the performance of the system. The method comprises the steps of simultaneously displaying information representative of the operation of the system at a plurality of test points to the user. For each of the test points, information representative of the operation of the system at a plurality of different bandwidths is simultaneously presented to the user during the displaying step. For each bandwidth associated with a given test point, a graphical image representative of the operation of the system at the given test point is presented to the user simultaneously during the displaying step.

15 Claims, 6 Drawing Sheets

BROAD BAND TEST POINT ELEMENT MANAGEMENT SYSTEM

FIELD OF THE INVENTION

This invention relates to a method for graphically presenting information representative of the operation of a communication system to a user monitoring the performance of the communication system.

BACKGROUND OF THE INVENTION

It is believed to be known that there are varies types of systems and methods available for measuring the signal-to-noise ratio of a broad band communication system. The signal-to-noise ratio may be measured at a plurality of different test points in order to monitor a particular systems performance. The higher the signal to noise ratio at a particular test point, the stronger the signal is at that test point. Examples of such systems are described in U.S. patent application Ser. Nos. 09/588,387, entitled "Monitoring System For A Hybrid Fiber Cable Network", filed Jun. 6, 2000, 09/511,090 entitled "HFC Access Network Management System", filed Feb. 23, 2000, 09/511,087, entitled "Arrangement For Discovering The Topology Of An HFC Access Network, filed Feb. 23, 2000, and 09/511,702, entitled "Arrangement For Providing Mediated Access In An HFC Access Network", filed Feb. 23, 2000, which are assigned to the assignee or the present application, and incorporated herein, by reference. In conjunction with being able to measure the signal-to-noise ratio, a simple way of monitoring and displaying the measurement of the signal-to-noise ratio of a broad band communications system at a plurality of test points would be beneficial.

BRIEF SUMMARY OF THE INVENTION

The present invention is directed to a system and method for graphically presenting information representative of the operation of a communication system to a user monitoring the performance of the system. The system simultaneously displays information representative of the operation of the system at a plurality of test points to the user. For each of the test points, information representative of the operation of the system at a plurality of different bandwidths is simultaneously presented to the user. For each bandwidth associated with a given test point, a graphical image representative of the operation of the system at the given test point is also presented to the user.

The graphical user interface of the present invention can be used for monitoring the performance of various communications systems, including telephony or data communications systems. In some embodiments, the graphical user interface of the present invention is used to monitor the performance of broad band telephony or data communications systems.

Also in one embodiment, for each bandwidth associated with a given test point, the graphical user interface displays a graphical image representative of the signal-to-noise ratio of the communication system at the given test point. For example, for each bandwidth associated with a given test point, a first color may be presented by the graphical user interface if the signal-to-noise ratio of the system at the given test point exceeds a threshold, and at least one further color will be presented if the signal-to-noise ratio of the system at the given test point fails to exceed the threshold.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention. In the Drawings.

DETAILED DESCRIPTION OF THE INVENTION

Figure 1:
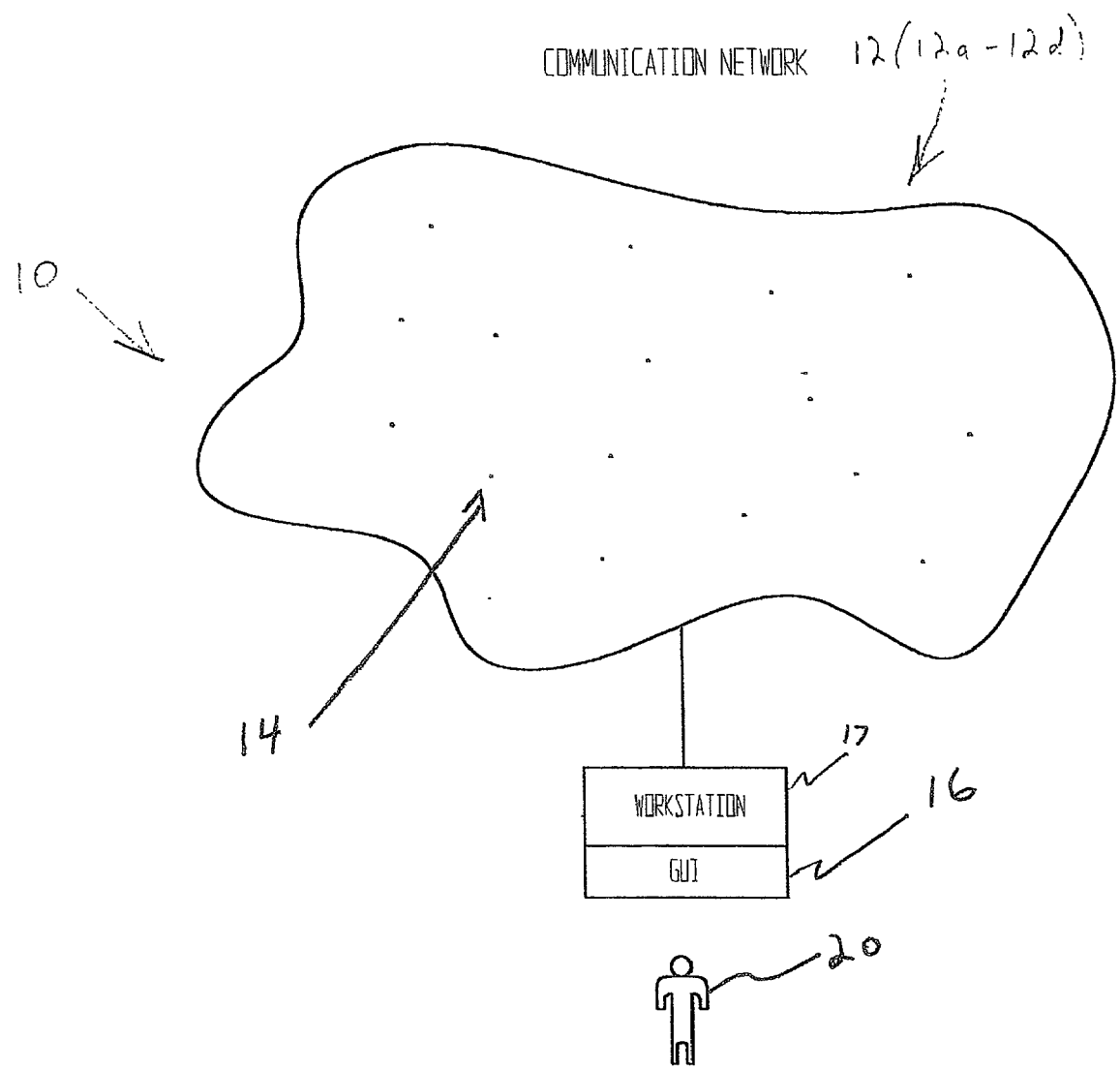
FIG. 1 is a block diagram of a broad band test point management system, in accordance with the present invention.

Referring to FIG. 1, there is shown a broad band test point management system 10 according to a preferred embodiment. The present invention provides a system and method for graphically presenting information representative of the operation of a communication system 12 to a user 20 monitoring the performance of the communication system 12. The method is preferably implemented using software which resides at least in part on workstation 17 and which functions to generate the graphical user interface (GUI) 16. The GUI 16 simultaneously displays information representative of the operation of the communication system 12 at a plurality of test points 14 to the user 20. In one embodiment, the GUI 16 displays information representing a signal to noise ratio of the communication system 12 to the user 20 as the user 20 monitors the communication system 12. The communication system 12 of the present invention, is generally a telephony system 12a. However, those skilled in the art should recognize that the communication system could be a broadband telephony system 12b, a data system 12c, a broadband data system 12d, or any other communications network.

Figure 2:
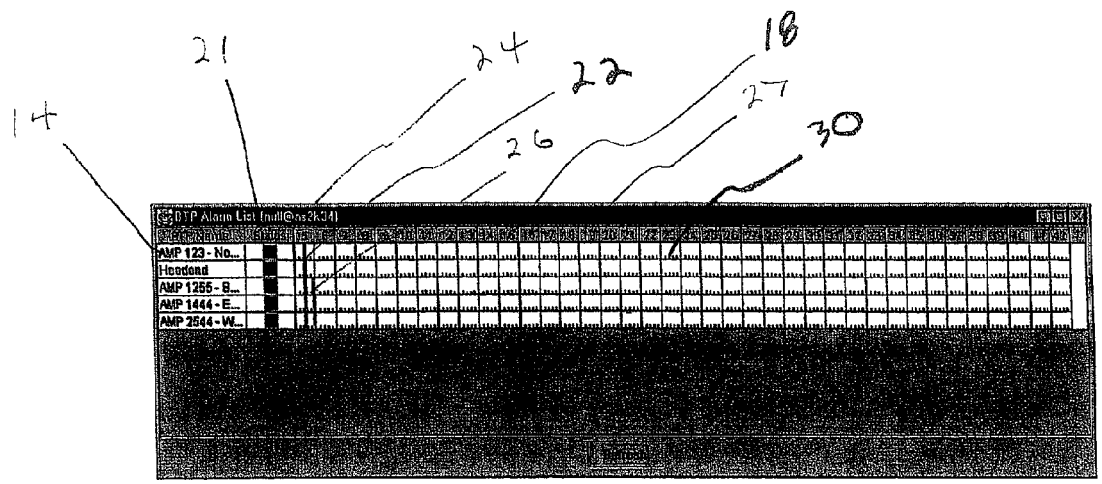
FIG. 2 shows a user interface for displaying test point status, in accordance with the present invention.

FIG. 2 shows an example of how the GUI 16 appears to a user monitoring the operation of the system 10 on workstation 17. The GUI 16 displays information representing the performance of a plurality of test points 14 and a status bar 21 to the user 20. In addition, for each test point 14, information representing performance at a plurality of bandwidths 18 is simultaneously displayed and presented to the user 20. In the example shown, the plurality of bandwidths 18 are broken down into 200 KHz intervals 30, however, it will be understood by those skilled in the art that bandwidths of any interval or size may be used. For each of the plurality of bandwidths 18 associated with each of the plurality of test points 14, a graphical image 22 representative of the signal-to-noise ratio at the given test point and bandwidth is presented to the user 20. The graphical image 22 associated with each of the plurality of test points 14 is illustrated by vertical bar(s) 26 disposed in each of the plurality of bandwidths 18. A preferred range 5–42 MHz for the plurality of bandwidths 18 has been predetermined. The preferred range 18 is generally representative of the minimum and maximum magnitudes of the signal to noise ratio of the communication system 12. However, those skilled in the art will recognize that the range in magnitude of frequency being displayed could be increased, decreased or shifted without departing from the spirit and scope of the claimed invention.

For each of the plurality of bandwidths 18 associated with each of the plurality of test points 14, a graphical image 24 representative of the status of operation of the system 10 is presented to the user 20. The graphical image 24 is presented in the form of a color. The color red is displayed to the user 20 if the signal-to-noise ratio of the system 10 at each of the plurality of test points 14 exceeds a predetermined threshold. The color green is displayed to the user 20 if the signal-to-noise ratio of the communication system 12 at each of the plurality of test points 14 fails to exceed the predetermined threshold. The color yellow indicates a moderate signal-to-noise ratio to the user 20.

Figure 3A:
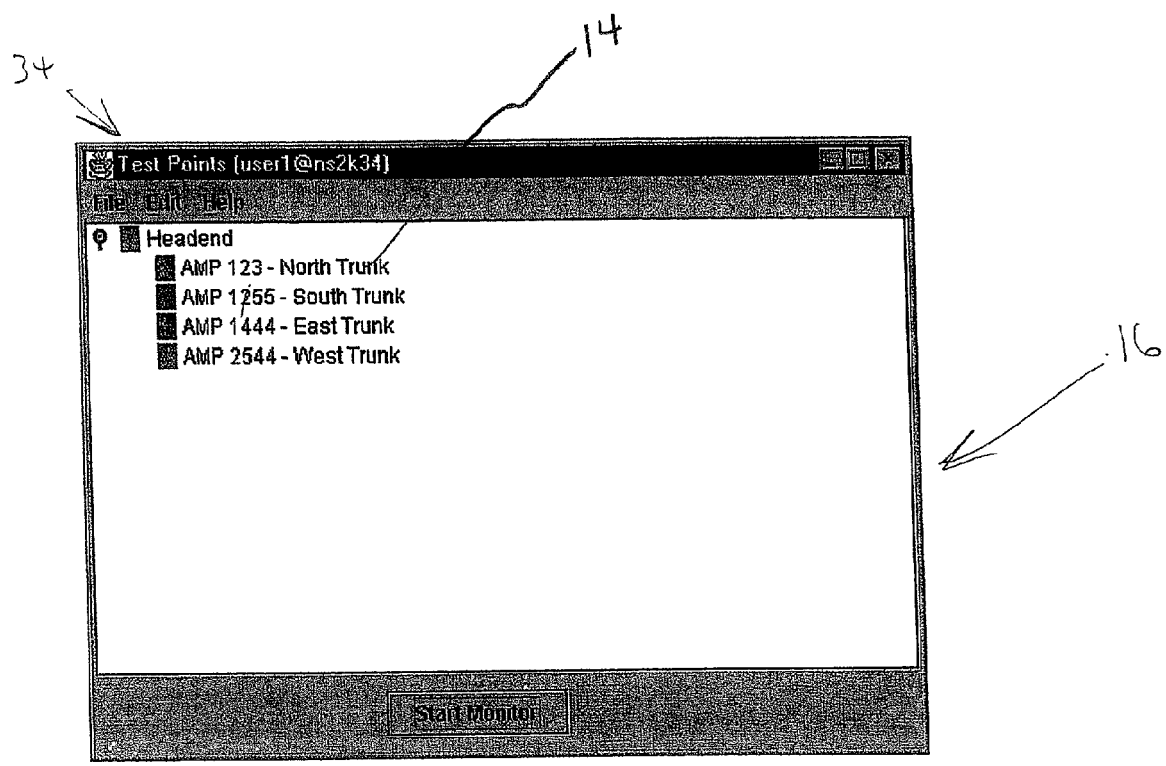
FIGS. 3A–3D show various screens used for modifying, editing and/or deleting test points and test point properties using the graphical user interface of the present invention.

Referring now to FIG. 3A, there is shown the graphical user interface 16 showing the test points 14 in the monitor mode 34. A visual display of each of the plurality of test points 14 in the communication system 12 are presented to the user 20.

Figure 3B:
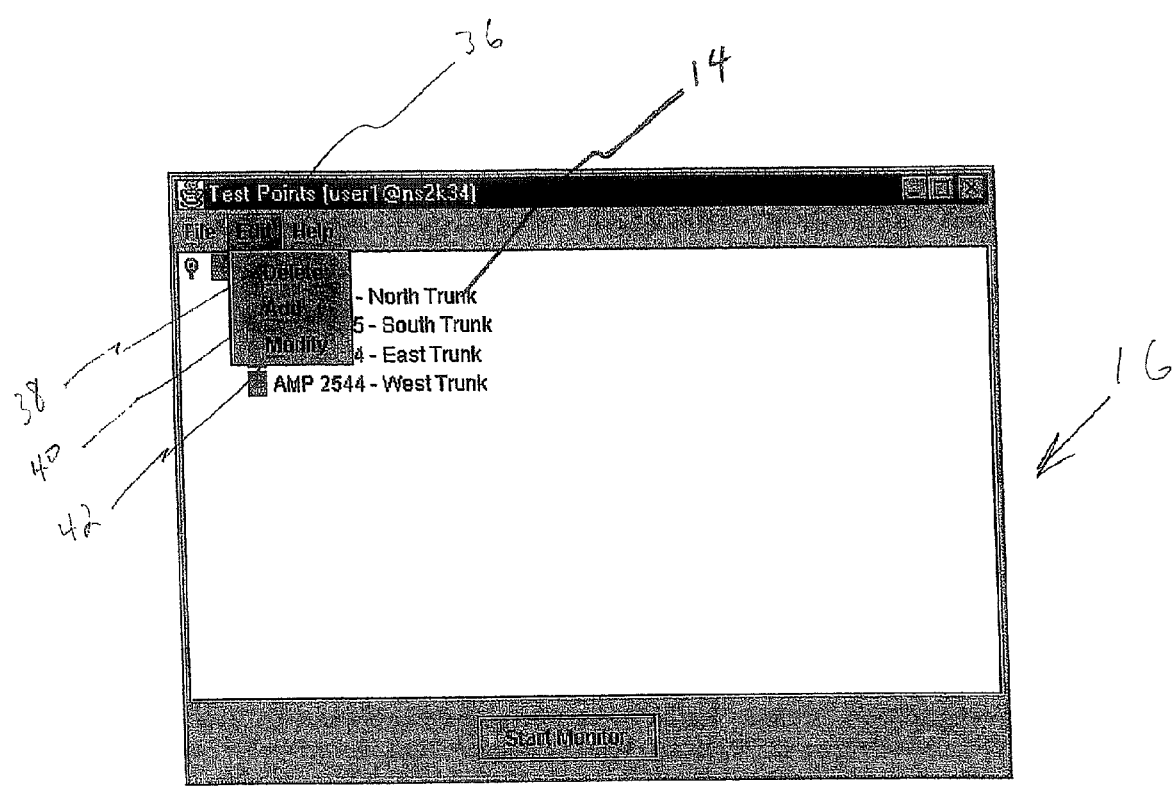

Referring now to FIG. 3B, there is shown the graphical user interface 16 showing the test points 14 in an edit mode 36. In the edit mode 36, the user 20 has the option to delete 38, add 40, or modify 42 one of the plurality of test points 14.

Figure 3C:
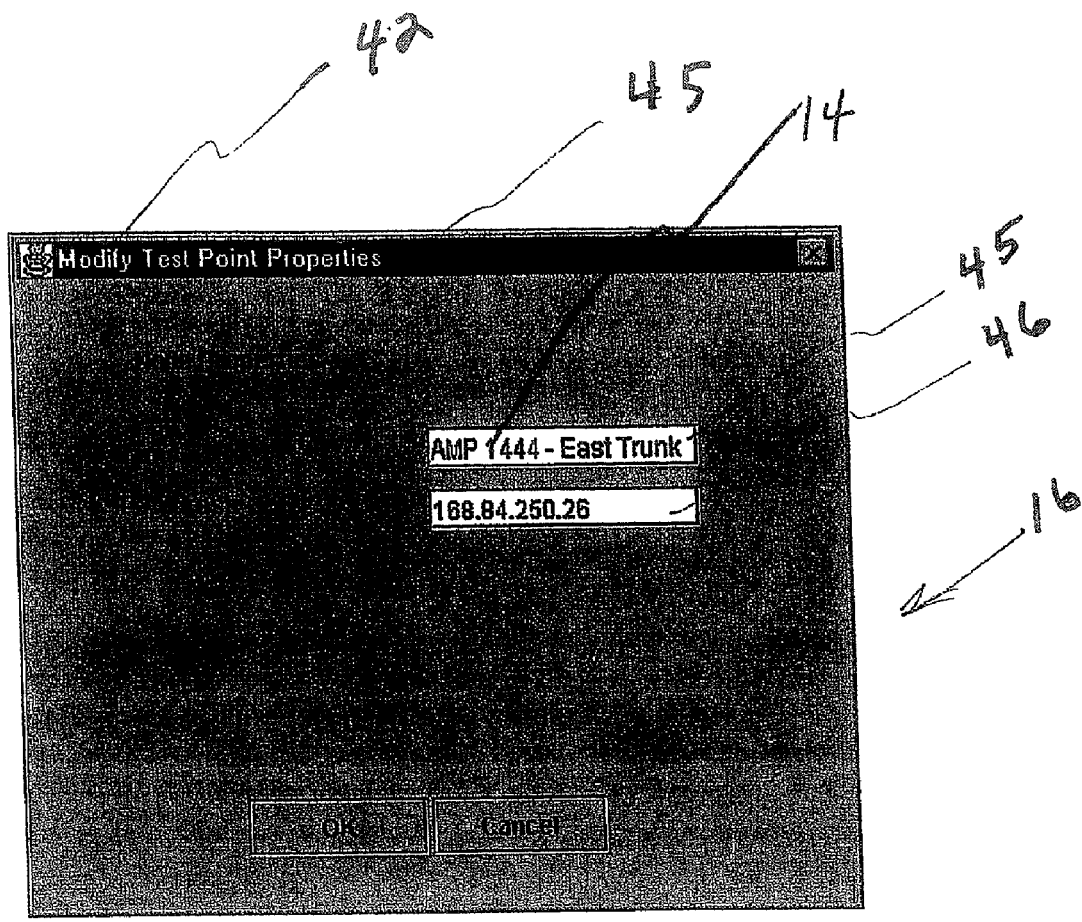

Referring now to FIG. 3C, there is shown the graphical user interface 16 in a modifying dialog mode 42. In the modifying dialog mode 42, properties 43 of each of the plurality of test points 14 are displayed and may be modified. The properties 43 include the name 44 of each of the plurality of test points 14, the location 45 of each of the plurality of test points 14 in the communication system 12, and the IP Address 46 of each of the plurality of test points 14.

Figure 3D:
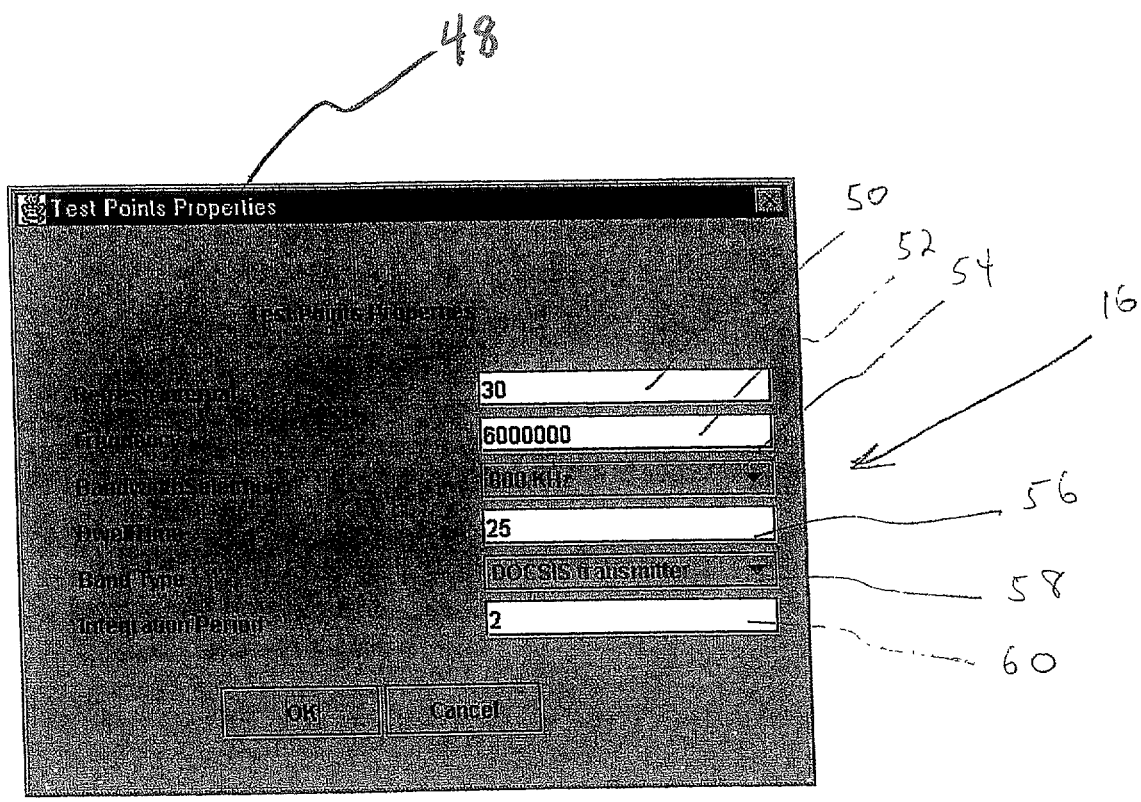

Referring now to FIG. 3D, there is shown the graphical user interface 16 presenting the options in the properties dialog 48. The options in the properties dialog 48 include, a refresh interval 50, a frequency 52, a bandwidth selection 54, a dwell time 56, a band type 58, and an integration period 60.

It will be appreciated by those skilled in the art that changes could be made to the embodiments described above without departing from the broad inventive concept thereof. It is understood, therefore, that this invention is not limited to the particular embodiments disclosed, but is intended to cover modifications within the spirit and scope of the present invention as defined in the appended claims.

What is claimed:

1. An apparatus for graphically presenting information representative of the operation of a communication system to a user monitoring the performance of the system, comprising:

a graphical user interface that simultaneously displays information representative of the operation of the system at a plurality of test points to the user, wherein the graphical user interface displays:
 a plurality of different bandwidths simultaneously presented to the user for each of the test points, wherein for each of the plurality of different bandwidths, for each of the plurality of test points, the graphical user interface displays:
  information representative of the signal-to-noise ratio at the given test point for each bandwidth; and
  a graphical image representative of the operation of the system at the given test point for each bandwidth.

2. The apparatus of claim 1, wherein the communication system is a telephony system.

3. The apparatus of claim 1, wherein the communication system is a data system.

4. The apparatus of claim 1, wherein the communication system is a broadband telephony system.

5. The apparatus of claim 1, wherein the communication system is a broadband data system.

6. The apparatus of claim 1, wherein, for each bandwidth associated with a given test point, a graphical image representative of the signal-to-noise ratio of the system at the given Lest point is presented to the user.

7. The apparatus of claim 6, wherein for each bandwidth associated with a given test point, a first color is presented to the user if the signal-to-noise ratio of the system at the given test point exceeds a predetermined threshold, and at least one further color is presented to the user if the signal-to-noise ratio of the system at the given test point fails to exceed the predetermined threshold.

8. A method for graphically presenting information representative of the operation of a communication system to a user monitoring the performance of the system, comprising the steps of:
 simultaneously displaying information representative of the operation of the system at a plurality of test points to the user;
  wherein, for each of the test points, information representative of the signal-to-noise ratio at a plurality of different bandwidths is also simultaneously presented to the user during the displaying step; and
  wherein, for each bandwidth associated with a given test point, a graphical image representative of the operation of the system at the given test point is also presented to the user simultaneously during the displaying step.

9. The method of claim 8, wherein the communication system is a telephony system.

10. The method of claim 8, wherein the communication system is a data system.

11. The method of claim 8, wherein the communication system is a broadband telephony system.

12. The method of claim 9, wherein the communication system is a broadband data system.

13. The method of claim 8, wherein, for each bandwidth associated with a given test point, a graphical image representative of the signal-to-noise ratio of the system at the given test point is presented to the user during the displaying step.

14. The method of claim 13, wherein for each bandwidth associated with a given test point, a first color is presented to the user if the signal-to-noise ratio of the system at the given test point exceeds a predetermined threshold, and at least one further color is presented to the user if the signal-to-noise ratio of the system at the given test point fails to exceed the predetermined threshold.

15. A computer readable medium having stored therein instructions for graphically presenting information representative of the operation of a communication system to a user monitoring the performance of the system, wherein the instructions, when executed by a processor, cause the processor to:

simultaneously display information representative of the operation of the system at a plurality of test points to the user;

wherein, for each of the test points, information representative of the signal-to-noise ratio at a plurality of different bandwidths is also simultaneously presented to the user during the displaying step; and wherein, for each bandwidth associated with a given test point, a graphical image representative of the operation of the system at the given test point is also simultaneously presented to the user.

* * * * *